United States Patent [19]
Castaldi

[11] 3,883,008
[45] May 13, 1975

[54] ARTICLE TRANSFER DEVICE
[75] Inventor: John A. Castaldi, Brooklyn, N.Y.
[73] Assignee: Supreme Equipment & Systems Corp., Brooklyn, N.Y.
[22] Filed: Nov. 15, 1973
[21] Appl. No.: 416,286

[52] U.S. Cl.... 214/1 BB; 214/16.4 A; 214/16.1 DB
[51] Int. Cl............................................. B25j 3/00
[58] Field of Search ..... 214/1 BB, 16.1 D, 16.1 DB, 214/16.4 R, 16.4 A

[56] References Cited
UNITED STATES PATENTS
2,602,557  7/1952  Sinclair.................... 214/16.1 DB
3,055,517  9/1962  Kirkland................... 214/16.1 DB
3,297,379  1/1967  Artaud et al............... 214/16.4 A X Primary Examiner—Robert J. Spar
Assistant Examiner—R. B. Johnson
Attorney, Agent, or Firm—Hopgood, Calimafde, Kalil, Blaustein & Lieberman

[57] ABSTRACT

The invention contemplates retrieval and return mechanism as part of a carriage support and drive means for use in storage systems for modular containers, such as file boxes and the like, accommodated in horizontally accessible storage openings within a two-dimensional frame matrix. A traveling elevator system includes container-handling means which, on command, will retrieve as many as three such containers from specified storage locations and which will deposit them for concurrent operator access and viewing at one end of the frame matrix; thereafter, having remembered the storage location for each container, the mechanism will, again on command, return each container to its correct original location within the storage matrix.

13 Claims, 9 Drawing Figures

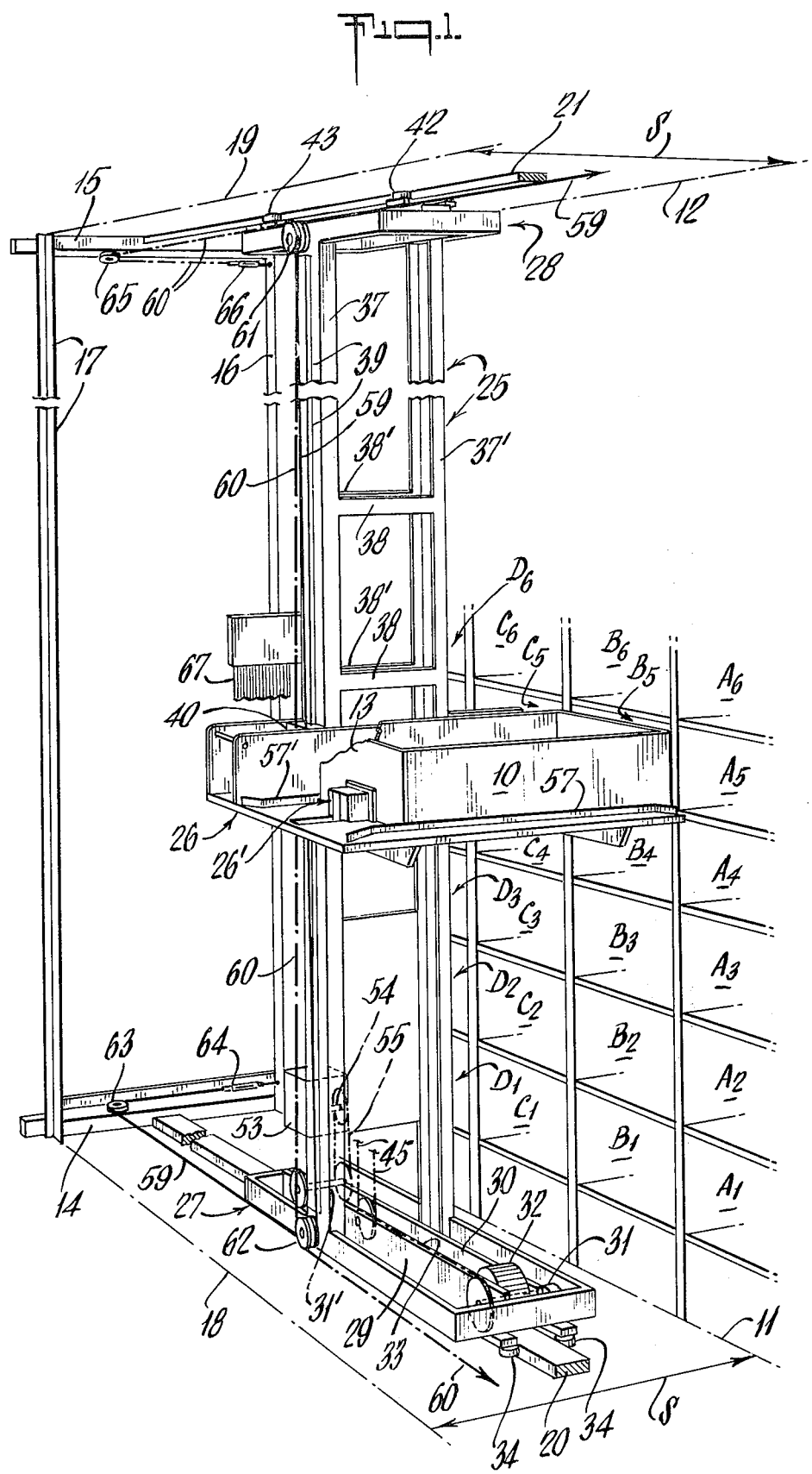

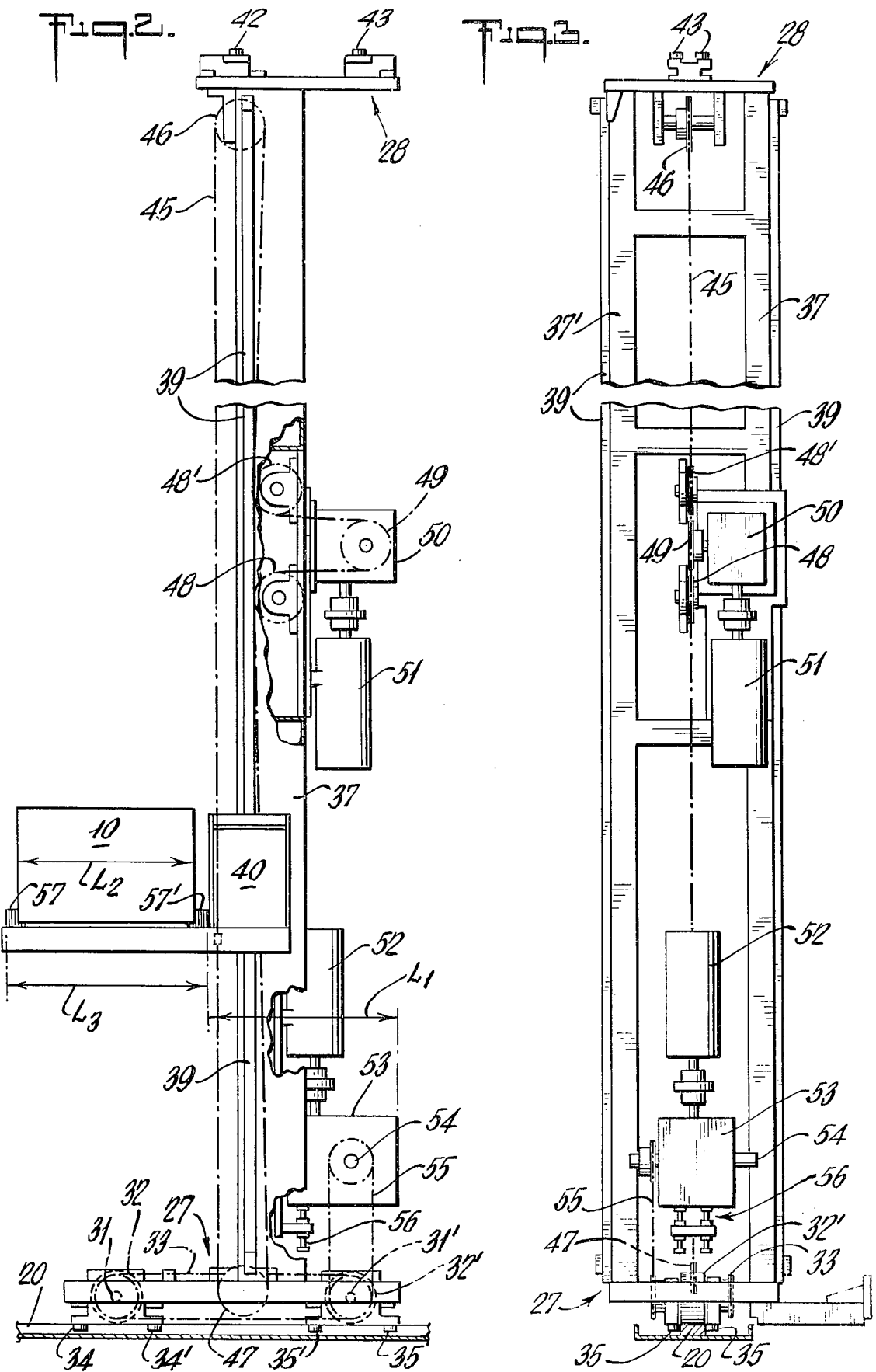

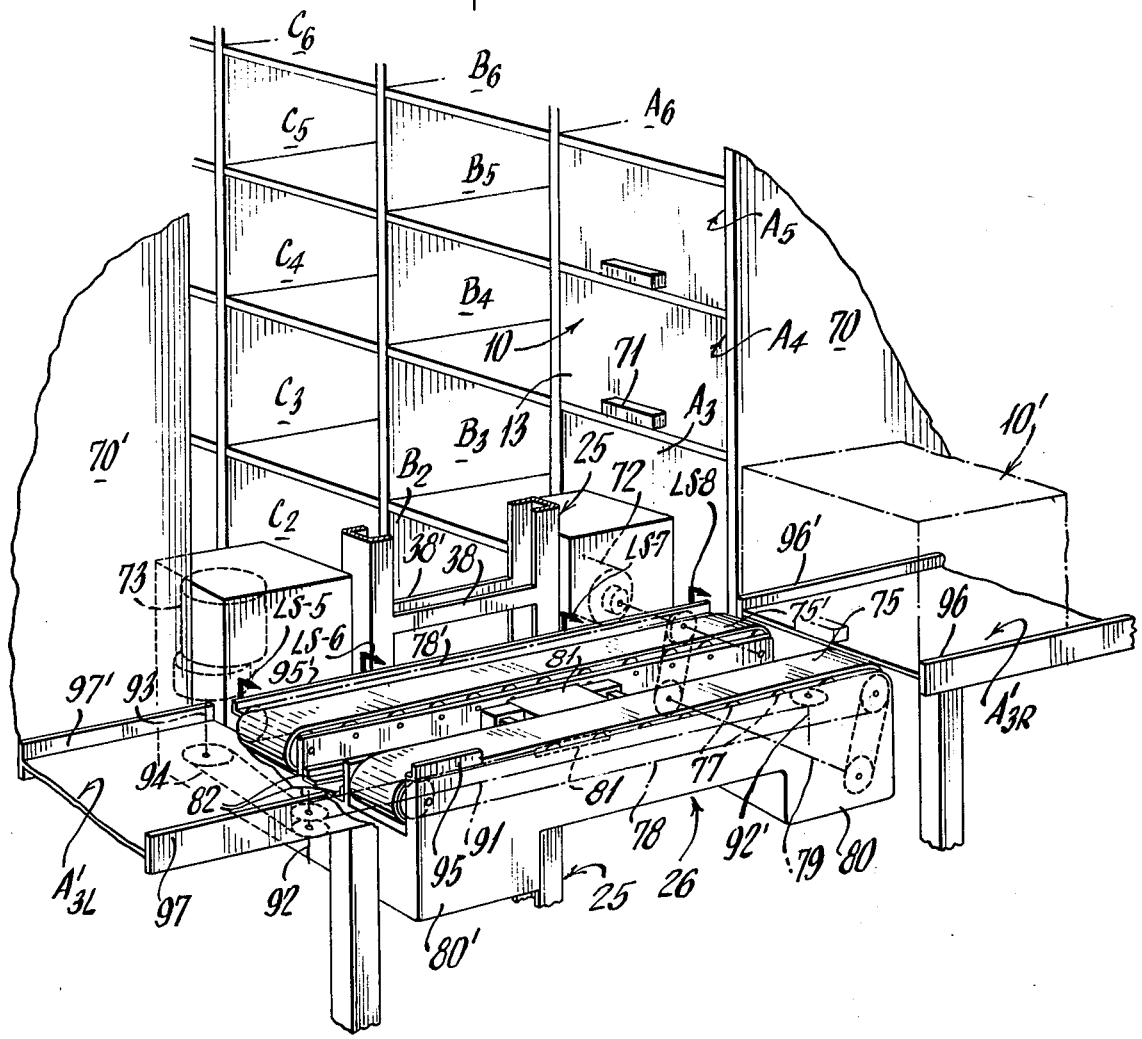

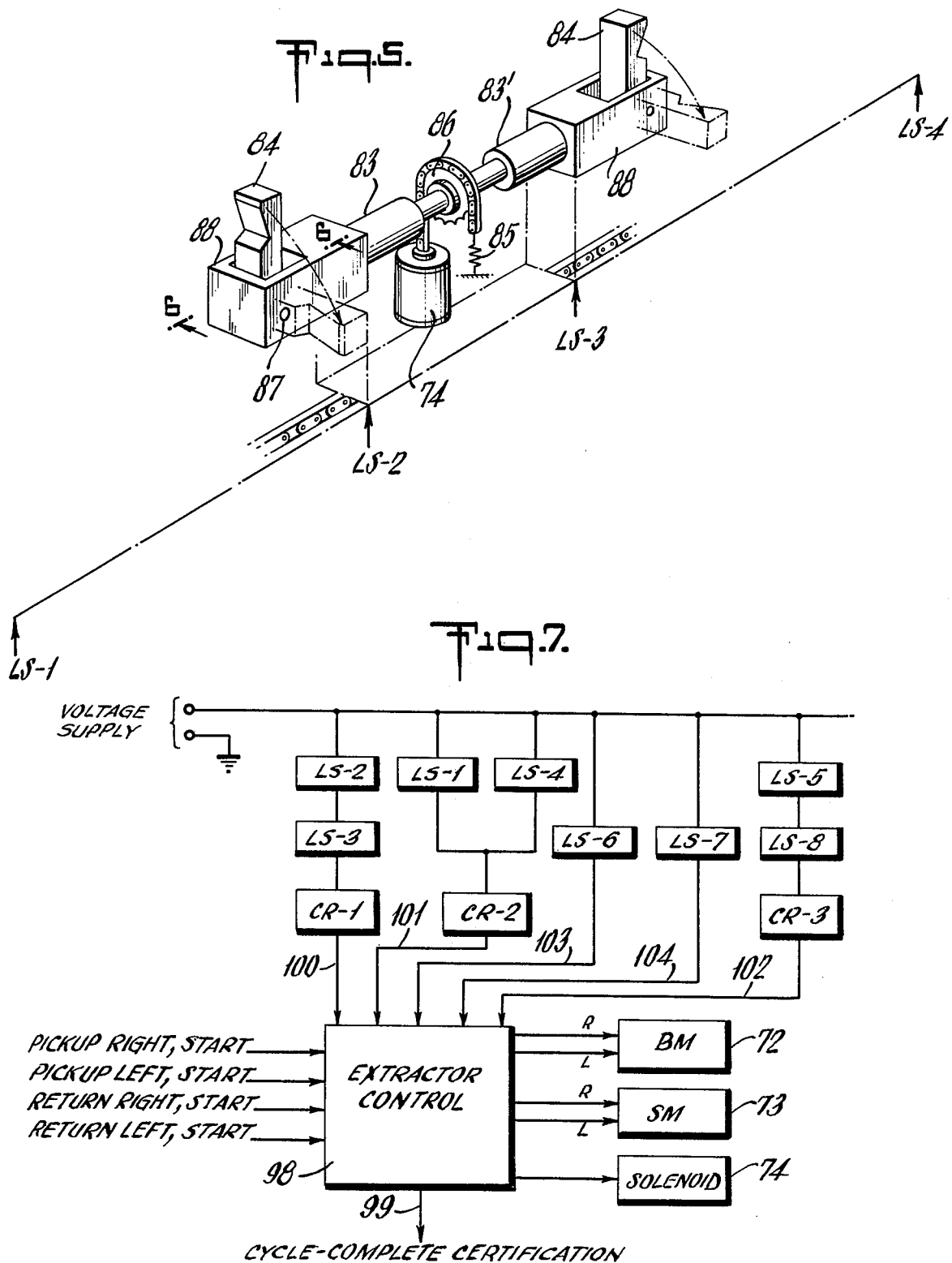

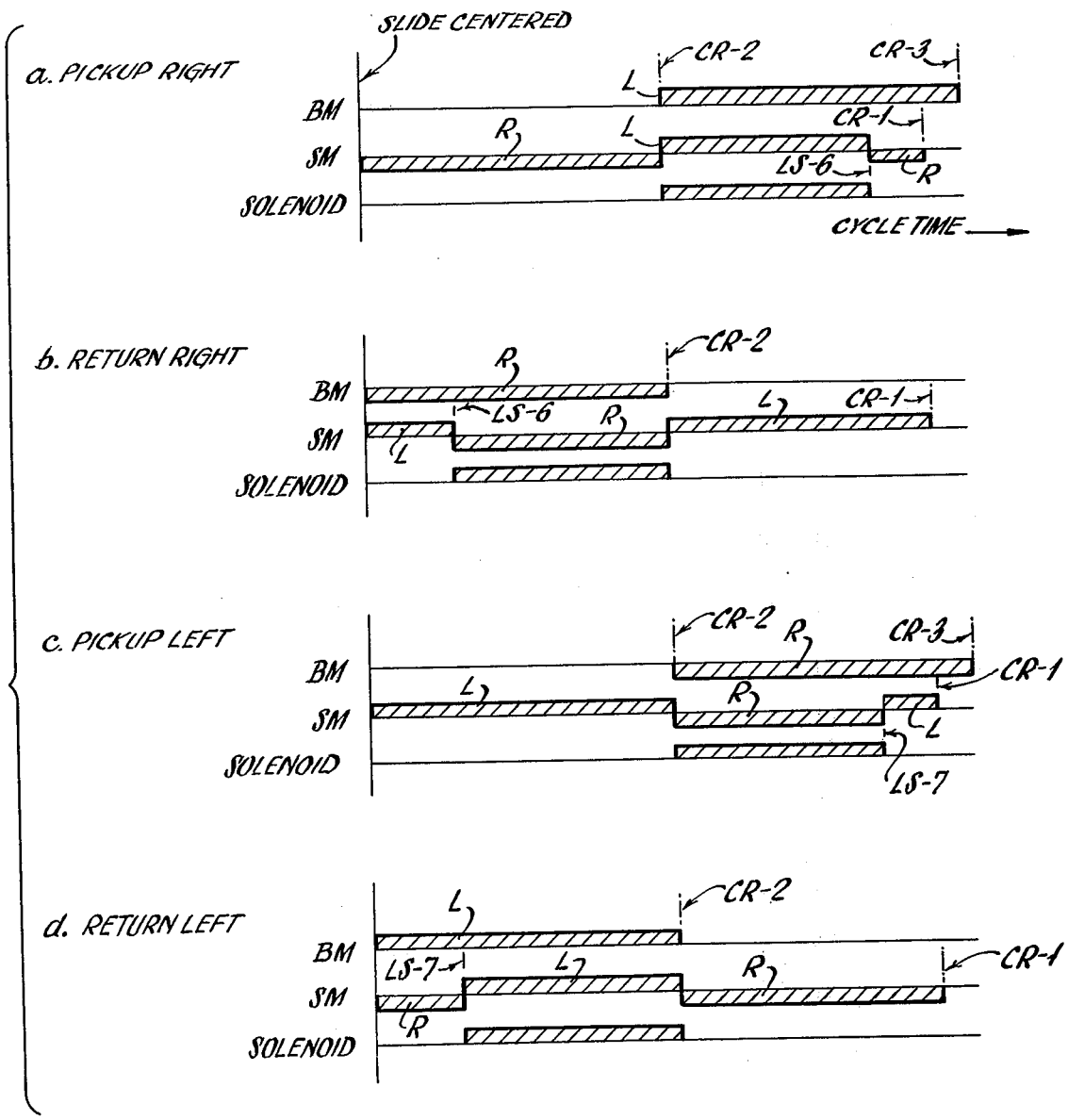

ARTICLE TRANSFER DEVICE

The invention relates to storage systems of the variety wherein modular containers such as file boxes or the like are stored and automatically retrieved from horizontally accessible storage openings or compartments within a two-dimensional frame matrix.

Systems of the character indicated are known from various patents, including Castaldi U.S. Pat. No. 3,526,326. In such systems, a central arrangement of plural upper and lower rails accommodates a carriage frame which is caused to longitudinally course the space between two such storage matrices, with facing horizontal-access openings, and an elevator slide on the carriage provides a second component of access to these storage openings. To assure fidelity of access-opening registration, the carriage and carriage-support and drive mechanisms have been bulky, requiring as many as 12 rolling contacts above and below the carriage, quite aside from such additional contacts as are required for stabilization of longitudinal alignment. Also, the "dead space" required for basic carriage support and drive functions becomes a significant fraction of the storage capacity of the system, especially in smaller installations, as for small-office filing purposes. Still further, there have been certain limitations on the number of containers retrievable at a given time, as well as limitations on the ability to return a given container to the same location from which it was retrieved.

It is an object of the invention to provide an improved construction of the character indicated and having particular application to small-office use, as for example in a storage room which may previously have had to be considered a "dead-storage" room due to the inconvenience and difficulty of handling file boxes and the like.

Another object is to provide a relatively simple and reliable file and retrieval storage system, particularly applicable to efficient use of a given relatively small volumetric space for file or file-box storage.

A further object is to meet the above objects with a construction that lends itself to relatively simple maintenance.

It is also an object to achieve the above objects with a system which is rapid in its transport functions.

A specific object is to substantially simplify the primary support and drive mechanism of a storage system of the character indicated.

Another specific object is to provide means in such a system whereby more than one container at a time may be retrieved from storage and positioned for concurrent viewing access, the same being automatically returned to correct original storage positions after such access.

Other objects and various further features of novelty and invention will be pointed out or will occur to those skilled in the art from a reading of the following specification in conjunction with the accompanying drawings. In said drawings, which show, for illustrative purposes only, preferred forms of the invention:

FIG. 1 is a simplified view in perspective of a storage and retrieval system of the invention, parts being brokenaway and fragmentary, and the view being taken generally from the front, in terms of the longitudinal end at which retrieved-item access is available;

FIG. 2 is a fragmentary side view in elevation of the carriage of FIG. 1;

FIG. 3 is a rear-end view in elevation of the carriage of FIG. 1;

FIG. 4 is a view similar to FIG. 1 to illustrate modified container-handling mechanism in application to a system as shown in FIG. 1;

FIG. 5 is an enlarged simplified view in perspective to show container-engageable elements forming part of the mechanism of FIG. 4;

FIG. 6 is an enlarged fragmentary sectional view, taken at 6—6 in FIG. 5 and shown in engaged relation to part of a container;

FIG. 7 is a simplified electrical diagram to schematically show automatic control elements for operating the mechanism of FIG. 4;

FIG. 8 is a graphical display of cooperative functions for each of four different cycles of operation of the apparatus of FIGS. 4 to 7, said cycles being separately identified $a$, $b$, $c$, $d$.

Figure 9:
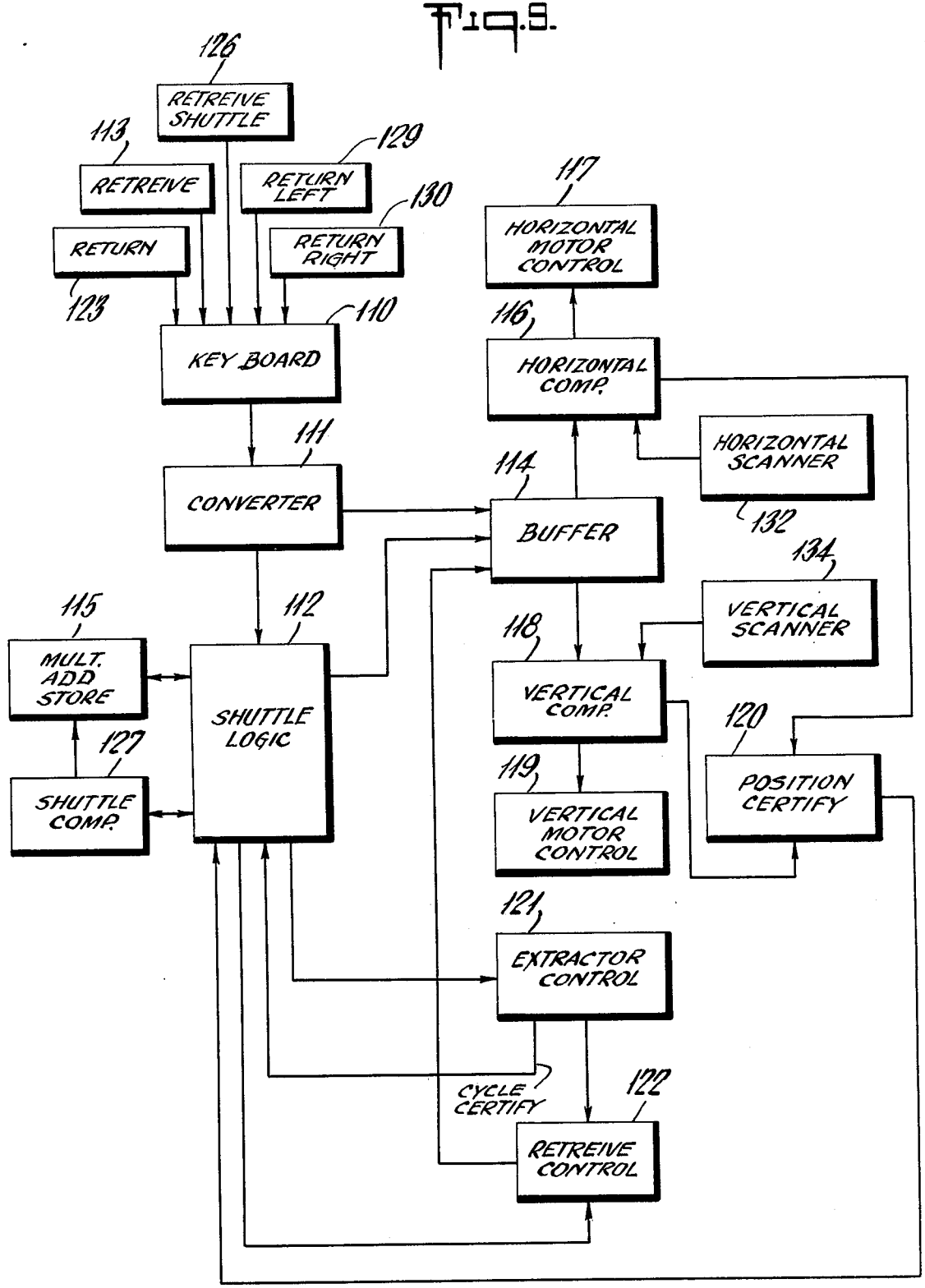
FIG. 9 is another electrical diagram schematically illustrating control means for the overall machine, particularly as it generates command signals to the circuit of FIG. 7.

The invention is shown in application to storage and retrieval manipulation of modular container units such as the file box or drawer 10, sized for accommodation in a selected one of a plurality of storage compartments within a two-dimensional frame matrix; and the particular variety of such mechanism is as shown as described in my copending application, Ser. No. 313,970, filed Dec. 11, 1972. As shown, the matrix is an array of like rectangular prismatic spaces accessible via open ends in a single vertical plane, the array being generally designated by numerical subscripts for the successive vertical levels of horizontally adjacent rows A-B-C-D, etc. Each storage compartment of the frame will be understood to include suitable means for the guided retention of an inserted container, insertable and retrievable endwise via the plane of the open ends, said plane being suggested in FIG. 1 by lower and upper parallel horizontal alignments 11–12, which may be at substantially floor and ceiling elevations of the available storage room. The depth of each storage compartment will be understood to be such that the exposed end wall of each stored container, such as the end wall 13 of container 10, lies substantially in or just inside the access plane 11–12 when stored; as shown, container 10 is aligned for accommodation within the storage compartment $B_5$.

Fixedly related to the desired matrix of storage compartments is further framing, including lower and upper transverse horizontal members 14–15, extending between vertical members 16–17; member 16 may be a corner element of the described matrix, and member 17 may be a corner element of a second and similar matrix of further storage compartments having horizontal access openings in a single vertical plane, suggested by lower and upper horizontal alignments 18–19, parallel to the alignments 11–12, and spaced therefrom to the extend S. A single lower rail 20 and a single upper rail 21 and rigidly connected to end members (14–15, respectively) and are centrally positioned between the parallel vertical planes of access (11–12 and 18–19) to the respective storage-compartment matrices. For convenience, the perspective of FIG. 1 will be deemed to be taken from the front, so that the storage compartments having access through the plane 11–12 can be termed right-hand storage, while those having access to the left and through the plane 18–19 can be termed left-hand storage.

In accordance with a feature of the invention of said pending application, the lower rail 20 provides total vertical support and longitudinal drive reference for a carriage 25 having a vertically positionable elevator platform 26 for accommodation of a given storage container 10 at any one time; a transversely driven actuator, for container-transfer to and from one of the storage matrices, is indicated at 26' and may be of the nature described in said Caslaldi patent. The lower rail 20 provides an additional function of laterally stabilizing or guiding the carriage 25, and the upper rail 21 provides a similar stabilizing function for the upper end of carriage 25. As shown, both rails 20–21 are simple straight bars of rectangular section, the greater sectional dimension being preferably horizontal, so as to reduce vertical limitation on overall storage volume, and so as also to present a relatively wide flat upper horizontal surface at lower rail 20 for carriage-load distribution.

CARRIAGE AND ELEVATOR MECHANISM

Carriage 25 comprises a single vertical column, united at its ends to elongated rectangular lower and upper horizontal chassis frames 27–28. Laterally spaced central longitudinal members 29–30 form part of the rigid lower chassis 27, providing firm journaled mounting of spaced shafts 31–31' for supporting rollers or wheels 32–32' at front and rear locations on the lower chassis. The two wheels 32–32' provide the entire vertical support and longitudinal drive engagement for carriage 25; they are thus equipped with relatively wide treads to substantially match the width of rail 20, and I prefer that at least the tread portion thereof shall be of suitable tough plastic, such as a circumferentially continuous tire of solid urethane, for long life, positive traction and braking efficiency. Wheels 32–32' are coupled for concurrent drive, as by an endless-chain connection 33 of sprockets locked to shafts 31–31+; provision for chain tensioning of a slidable front bearing mount is suggested at 33' (FIG. 2). For lateral-positioning stability, I provide front and back pairs of rolls, such as the front pair 34, depending from the chassis 27 on laterally spaced vertical axes, for guiding engagement with opposite lateral sides of rail 20. A similar pair of stabilizing or guide rolls 35 is provided at the rear end of chassis 27 and, if desired, such pairs may be further provided in duplicate, at 34' and 35' (see FIG. 2), for even further assurance of stable alignment.

The vertical column of carriage 25 is shown to comprise a single box girder consisting of upstanding channels 37–37', held in laterally spaced relation by spacers 38–38' which respectively connect front walls and rear walls of channels 37–37'. For economy of longitudinal space utilization, channels 37–37' are secured to chassis 27 rearwardly of the longitudinal center, as best seen in FIG. 2. Vertical elevator guides 39 characterize laterally outer channel surfaces, and elevator 26 includes guide-engaging blocks 40 riding the guides 39.

The upper chassis 28 may be of generally the construction of chassis 27 and of longitudinally lesser extent, it being noted that chassis 28 extends no further rearwardly of column channels 37' than does the lower chassis 27. The upper chassis 28 serves primarily to complete the rigid structural integrity of the entire frame of carriage 25 and to provide a mounting platform for longitudinally spaced pairs of upwardly projecting stabilizing guide rolls 42–43, for guidance from opposed lateral sides of the upper rail 21.

Elevator-positioning drive is accomplished via an endless sprocket chain 45, over upper and lower idler sprockets 46–47 at the respective chassis elevations; the front span of chain 45 is forward of the column connection members 38 and is locally secured to elevator 26, while the rear span is accommodated within the column girder, being coursed over closely spaced idler sprockets 48–48' and an adjacent drive sprocket 49, the latter being secured to the output shaft of reduction-gearing means 50 by which it is reversibly driven by an electric motor 51. Both motor 51 and gear means 50 are mounted on the rear side of the carriage column, within the maximum rearward extend of the lower chassis 27, and the gear-reduction ratio at 50 is preferably relatively high (e.g., in the order of 40:1) in order that a selected elevator height may be effectively braked or held without resort to additional braking means, regardless of the load on the elevator platform. Preferably also, the selected mounting elevation of the vertical-drive elements 48 through 51 is such as to provide convenient accessibility for service maintenance, without requiring a stool, ladder or the like.

Below the vertical-drive mechanism (48 through 51), similar elements of horizontal-drive mechanism are also mounted on the column girder, and within the limiting rear fraction of chassis 27. As shown, a horizontal-drive electric motor 52 is mounted above reduction-gear means 53, having an output shaft 54 directly over the rear shaft 31', for roller 32 and its sprocket connection to chain 33. A short sprocket-chain 55 couples the shafts 31'–54, and adjustable tensioning of this coupling is suggested at 56.

It will be noted that all parts of the drive mechanisms are readily accommodated within what may be termed the lower half of the column and yet within the relatively short rearend offset of the lower chassis 27, thus facilitating direct maintenance access and entailing no limitation on the rearward extent of the carriage profile. Stated in other words, the longitudinal distance $L_1$ (FIG. 2) to which the carriage extends rearwardly of a container 10 on elevator 26 is relatively small and in the order of magnitude of a container width $L_2$, or of the elevator loading dimension $L_3$ which embraces quide rails 57–57' for lateral transfer of container 10 to and from the elevator platform.

In storage and retrieval systems of the character indicated wherein overall longitudinal space is not particularly large, e.g., a rail 20 of length up to 12 or 15 feet, the rearward offset of shaft 31' can be made relatively short, in order to reduce the dead space $L_1$ as much as the size and mounting of drives 50–51 and 52–53 will permit. In that circumstance, I provide vertical-stabilizing action for the carriage 25 through a pair of tensed cables 59–60, as best seen in FIG. 1. As shown, both cables are firmly rooted to the storage framework, and they pass over idler pulleys on an upper-chassis stud pin 61 and on a lower-chassis stud pin 62. Specifically, cable 59 is anchored at the lower rear end of the frame, via a pulley 63 and turn-buckle 64 to frame members 14–16, pulley 63 being positioned to define a lower strictly longitudinal course of cable 59, between pulleys at 63–62; cable 59 rises thence alongside the column channel 37 to the outer pulley at 61, for alignment of an upper strictly longitudinal course of cable 59 to an upper fixed front frame reference, schematically suggested by a heavy arrow at the break of this upper course in FIG. 1. In similar fashion, the second cable 60 is anchored at the upper end of the frame, via a pulley 65 and turnbuckle 66 to frame members 15–16, pulley 65 being positioned to define a strictly longitudinal course of cable 60, between pulleys at 65–61; cable 60 thence descends alongside the column channel 37 (and cable 59) to the inner pulley at 62, for alignment of a lower strictly longitudinal course of cable 60 to a lower fixed front frame reference, schematically suggested by a heavy arrow at the break of this lower course in FIG. 1.

In practice, it is found that, as long as the overall length of the system, e.g., rail 20, is not great enough to make stretch of cables 59–60 a deleterious factor, these cables need only be tensed sufficiently to eliminate slack, and they provide highly satisfactory and positive vertically stabilizing reaction against inertial overturning moments, during the most rapid accelerating and decelerating functions of carriage 25, and regardless of the magnitude or vertical elevation of the load on the elevator 26. This is accomplished for the described case wherein sole reliance is placed on the two rolls 32–32' of the lower chassis, for all drive and support functions, i.e., no reliance is placed on the upper rail 21 for any drive or vertical-reaction force, as has heretofore been considered necessary, for example in said Castaldi patent.

The structural arrangement thus far described will be seen to provide such simplicity, ruggedness and economy of space as to assure prolonged trouble-free operation and ready maintenance accessibility, for the indicated objective of serving relatively small office-storage purposes. For example, the lateral width W of the carriage frame may be sufficiently small compared to the spacing S between matrix-access planes 11–12 and 18–19, to permit a maintenance man to pass between a channel 37 (37') and the adjacent storage matrix (the elevator being in a sufficiently raised position, or in its bottom position); once past the carriage, maintenance personnel have easy reach to all drive mechanisms, without any need to climb. This clearance between carriage 25 and an adjacent matrix is also useful in accommodation of wide ribbons of flexible multiple-conductor cable which carry control and excitation potentials used in automated operation of the carriage 25; no attempt has been made to show such cables in the drawings, but a broken end connection of one of them is shown at 67, fastened to a laterally offset terminal bracket 68 on channel 37 (FIG. 1).

In a typical use of the invention, file boxes 10 of full file-cabinet size, e.g., 30-inches long and with end-wall (13) dimensions appropriate to business-letter or legal-file size, as desired, a two-matrix system may be served by the single monorail carriage 25, within an 8.2-foot wide dead storage room; length of the rail 20 and matrices served thereby is appropriate to the particular office-storage needs, and a single door in the narrow-dimension wall of the room will meet all access requirements, it being understood that the retrieval mechanism (i.e., programmed coordination of horizontal and vertical drives) will always bring a retrieved container to a forward location, for examination of contents or for removal, all as more fully set forth in said Castaldi patent.

LOAD-MANIPULATING MECHANISM

FIGS. 4 to 7 are concerned with structure and control for manipulation of a selected container, the mechanism being carried by or part of the elevator 26 and serving container-retrieval and return functions at any given matrix-access coordinates. Specifically, in application to the system of FIG. 4, having a right-hand matrix of storage compartments $A_1 \ldots A_6$, $B_1 \ldots B_6$, Chd $1 \ldots C_6$ behind a right-front wall 70, and a similar left-hand matrix of storage compartments (not shown) behind a left-front wall 70', the container-manipulating structure performs the following functions:

I. With elevator 26 at any given storage-access coordinates:

a. mechanically engages a physical part, such as a handle or bracket portion 71, of the container 10 to be retrieved;

b. physically withdraws the selected container 10 from its storage-matrix location and places the same in centered location on the elevator platform, i.e., between the vertical planes 11–12 and 18–19 of FIG. 1;

II. After carriage displacement (shuttling) to the front of the system, and with the elevator 26 vertically positioned as convenient for viewing, in register with and between right-hand and left-hand viewing-table surfaces $A'_{3R} - A'_{3L}$:

c. physically displaces the container 10 to one of the viewing surfaces $A'_{3R} - A'_{3L}$, thereby relieving the elevator 26 for further retrieval functions while the contents of container 10 are being serviced or inspected; as will be described in connection with FIG. 9, the system logic biases viewing delivery preferentially to the left, at $A'_{3L}$, with automatic switch-over to right-viewing delivery at $A'_{3R}$, if the viewing space $A'_{3L}$ is occupied;

d. mechanically reloads the container 10 back onto the elevator, after the operator has completed inspection and/or servicing of container contents; and III. After carriage displacement back into the storage matrix, and with elevator 26 vertically positioned in register with its original storage location:

e. physically displaces the container 10 in the right of left direction, as appropriate, for return of the container into its original location.

The foregoing functions are achieved as the result of differently sequenced and directionally polarized excitation of two drive motors 72–73 and of a single actuating solenoid 74 (FIGS. 5, 7), all parts of the mechanism being carried by and built into the framework of the elevator platform 26.

Motor 72 provides directional drive to two spaced endless belts 75–75', the upper horizontal courses of which define the container-support plane of elevator 26. Each belt extends between laterally spaced drive rolls on shafts journaled in spaced upstanding frame members, such as members 76–76' for the case of the rolls for belt 75; it will be understood that members 76–76' may also carry idler rolls, as at 77, distributed between ends of the belt and providing plural points of support for the upper horizontal course thereof. As shown, a first chain 78 between end sprockets synchronization of the drive rolls for belt 75, and a second chain 78' similarly serves the drive rolls for belt 75'. Motor 72 directly drives one of the drive rolls for belt 75', and this drive is carried to belt 75 via a jack shaft 79 equipped with end sprockets having short chain connection to sprockets of the respective drive rolls for belts 75–75'. The jack shaft 79 may be conveniently journaled within a downwardly projecting lateral part 80 of the elevator frame, thus leaving an unobstructed channel space between adjacent frame members associated with the two belts 75–75'; the projecting frame part 80 and a similar part 80' on the left side of the elevator frame will be understood to clear the carriage frame 27 (FIG. 1), thus presenting no impediment to achieving the full vertical range of access to matrix-storage spaces. With all sprocket-drive ratios 1:1, the belts 75–75' are driven in unison and in the same direction, depending upon the controlled direction of drive by motor 72.

Within the space between the adjacent frame members associated with belts 75–75' is a slide 81, guided by elongated means 82 and carrying means for selective engagement to the bracket means 71 of a particular container 10. As best seen in FIG. 5, slide 81 carries like hook elements 84 at the respective ends of a horizontal shaft, journaled at 83–83' in the frame of slide 81. This horizontal shaft is limited to substantially 90 degrees of rotation, as determined by excitation of solenoid 74; in the unexcited condition of the solenoid, a spring 85 loads a chain to drive a shaft sprocket 86 to the hooks-retracted horizontal position suggested by phantom outline in FIG. 5, and in the solenoid-excited condition the sprocket chain is displaced to impart counter-clockwise rotation to vertically erect hook elements to the solid-line position of FIG. 5. Each hook element 84 has a lost-motion pivotal connection to a projecting end of the shaft, being shown pivot-pinned at 87 and limited by convergent walls of a recess in an extension or fitting 88 keyed to the shaft; in the limit of lost-motion shown in solid outline in FIG. 6, a spring 89 holds elements 84 at a right angle to the shaft axis, and at the other limit of lost motion (phantom outline 84') spring 89 is further stressed and an inclined recess face 90 of element 84 is vertically oriented to bear against the outer surface of the container handle or bracket 71.

The remaining drive utilizes selected directional operation of motor 73 to variously position slide 81 along its guide means 82. Slide 81 connects the ends of a positioning chain 91 looped around end sprockets on vertical shafts 92–92' within the respective frame regions 80–80'. The output of motor 73 is also on a vertical shaft (93) and has an offsetting sprocket-chain connection 94 to shaft 92. Thus, depending upon the direction of drive of motor 73, the slide 81 (and its hook elements 84) is positionable along guide means 82 (i.e., laterally of the center of elevator 26), and the hook elements 84 will remain beneath the supporting surface established by belts 75–75' unless and until solenoid 74 is energized. Upon solenoid actuation, both hook elements 84 are vertically erected. If the synchronization is such that slide 81 is adjacent a container 10 to be retrieved, then the adjacent hook element 84 will enter the included space between bracket 71 and the container body (in readiness for a container-extraction stroke); and if the timing is such as to erect the hook element prior to slide 81 reaching its extreme position, then the erected hook element 84 will be poised to engage the outer surface of bracket 71 (in the course of completing a container-return stroke of slide 81).

Description of the mechanical elements of structure is completed by pointing out that brackets 71 are preferably provided at corresponding regions of the respective ends of all containers, so that hook-element action can operate to position a given container to the right or to the left, as may be dictated by the instantaneous occupied condition of the viewing support surfaces $A'_{3R}$ and $A'_{3L}$. Also, lateral-guide rails or flanges 95–95' on the elevator, 96–96' on the right-hand support surface $A'_{3R}$, and 97–97' on the left-hand support surface $A'_{3L}$, may be provided to give added assurance of container guidance throughout the range of manipulations afforded by the described mechanism.

The described container-manipulating mechanism operates from command signals furnished by the control circuitry of FIG. 9, but shown in FIG. 7 as inputs to control means 98, labeled Extractor Control. For any one cycle of the mechanism, these command signals will be one of four, shown at input connections labeled "Pickup Right, Start", "Pickup Left, Start", "Return Right, Start", and "Return Left, Start", respectively; and upon completion of a cycle called for by any one of these commands, an output signal is furnished at 99 to certify such completion. Execution of any given command cycle requires timed or position-controlled operation of one or both motors 72–73, including selection of the direction of drive thereof, all as appropriately synchronized with excitation of solenoid 74. The extractor control means 98 is thus shown with separate outputs to motors 72–73 and to solenoid 74, and the legends L and R applied to the two outputs to each motor will be understood to schematically indicate the direction of drive governed by the particular output connection.

For synchronization based on displacement of slide 81, I show in FIG. 5 four limit switches to mark various positions and events throughout the path of guided movement of slide 81; such switches may be mounted within the trough of guide means 82 and poised for actuation by slide 81. First outer limit switches LS-1 and LS-4 mark extreme outer positions of slide 81, e.g., position as depicted in FIG. 6, with a hook element 84 enterable in the inner volume of a bracket 71, or with such hook element (84') having pushed a container all the way into its returned matrix-storage location or onto one of the viewing surfaces $A'_{3L}$ or $A'_{3R}$; second inner limit switches LS-2 and LS-3 are symmetrically offset from the center position along the path of movement of slide 81, being so spaced as to determine the center position of slide 81 when both switches LS-2 and LS-3 are simultaneously operated. As shown in FIG. 7, a first control relay CR-1 responds to this simultaneous operation, being series-connected to switches LS-2 and LS-3, and thus providing a signal input at 100 to certify (to control means 98) a centered return of the slide 81. A second control relay CR-2 is shown connected to switches LS-1 and LS-4 in parallel, to assure a control signal at 101 (to control means 98) for slide 81 reaching either one of its extreme outer positions.

For synchronization based on displacement of a container 10 on belts 75–75', I show in FIG. 4 four further limit switches, the same being fixedly mounted on a part of elevator 26, as along the guide rail 95' and poised for actuation by the adjacent presence of a side wall of a container 10. First outer limit switches LS-5 and LS-8 are symmetrically offset from the center position along the path of container movement between guides 95–95′, being so spaced as to determine a symmetrical loading of the elevator when both switches LS-5 and LS-8 are simultaneously operated; a third control relay CR-3 is connected to reflect this condition of symmetrical loading, through series-connection to switches LS-5 and LS-8, and to provide a signal input at 102 to certify (to control means 98) a centered symmetrical loading of the elevator. Finally, two inner limit switches LS-6 and LS-7 are shown with separate input connections 103–104 to certify, (a) in the case of LS-6, that the front panel 13 of a container of the right-hand matrix has cleared a location at which the container is approximately 70 percent borne by the belts 75–75′, and (b) in the case of LS-7 that the front panel 13 of a container of the left-hand matrix has cleared a location at which the container is approximately 70 percent borne by the belt system 75–75′.

Having thus identified the parts and their relationships, operation of the manipulative system on the elevator will be better understood from a description of a cycle of operation, taken in conjunction with diagrams a-b-c-d of FIG. 8, the same being respectively applicable for the separate indicated command signals from circuitry to be described in connection with FIG. 9.

FIG. 8a depicts the sequencing of controlled operations for a cycle responding to the single command pickup Right, and showing coordination of belt-motor drive (BM) with slide-motor drive (SM) and solenoid excitation, all starting with the slide 81 centered along track 82, and of course starting with platform 26 in proper register with a selected matrix location. FIG. 8a shows that such a cycle commences with excitation of the slide motor SM 73 in the R or right-hand direction, until such time as limit switch LS-4 operates relay CR-2, to certify achievement of the full extreme right-displaced position of slide 81, in readiness for hook-element erection into the inner volume of the bracket 71 of the desired container to be extracted. Operation of relay CR-2 (a) excites solenoid 74, (b) reverses drive excitation to the slide motor SM, and (c) excites the belt motor BM (72) for left-directed belt drive. Thus, the selected container is withdrawn (retrieved) from storage, being displaced onto the belt system 75–75′, in right-to-left extraction stroke. In the course of this extraction stroke, the front panel 13 of the container actuates switch LS-6 when the belts 75–75′ are approximately 70 percent loaded (meaning also that slide 81 has gone past its central position), and switch LS-6 is operative (a) to de-energize solenoid 74, allowing spring 85 to retract the hook-element engagement at 71, and (b) to reverse the slide motor SM back to a right-ward direction of drive. Slide 81 resumes rightward drive and belts 75–75′ continue their leftward motion, until control relay CR-1 certifies return to a centered position of slide 81, whereupon slide motor SM is effectively disconnected; belt drive continues leftward until operation of control relay CR-3 certifies that the extracted container is symmetrically positioned on the elevator. Completion of this cycle is signalled at 99 to carriage and elevator shuttle control mechanism (to be described in connection with FIG. 9), so that the carriage and its elevator may bring or shuttle the extracted container to the front or viewing stage of the system, the same being depicted in FIG. 4.

It has already been explained that the circuitry of FIG. 9 is left-primed, i.e., preset to preferentially direct an extracted and forwardly shuttle container for viewing at the left viewing surface A′$_{3L}$, when elevator 26 is aligned with the A′$_3$ coordinate location; thus, normally, the command issuing to control means 98 will be that labeled Return Left, Start in FIG. 7 and graphically represented by the Return Left diagram of FIG. 8d, governing control of means 72–73–74 to achieve primary loading at A′$_{3L}$. The circuit logic of FIG. 9 is, however, further such as to index the setting for direction of container delivery to the right-hand viewing surface A′$_{3R}$, should a container already be occupying the primary (left-primed) viewing surface A′$_{3L}$; in this latter event, the circuit of FIG. 9 will instruct the control means 98 with the command Return Right, the sequenced cycle of which is graphically depicted in FIG. 8b.

The Return Right cycle commences with the container 10 and slide 81 centered on the elevator. The command is executed by initiation of belt-motor drive in the rightward direction R and of slide-motor drive in the leftward direction L. When slide 81 clears the inner-left limit switch LS-6, its right-end hook element 84 has cleared the front panel 13 of container 10; at this juncture, switch LS-6 operates to apply a signal at input 103 (to control means 98) calling for (a) excitation of solenoid 74 and (b) reversal of the slide-motor drive, i.e., changing to the rightward direction R. Both motors 72–73 continue driving to the right until limit switch LS-4 operates relay CR-2 to certify that slide 81 has reached its extreme-right position, with container 10 pushed all the way to its viewing position on surface A′$_{3R}$, as shown by phantom outline 10′ in FIG. 4. Operation of relay CR-2 terminates excitation of solenoid 74 and of the belt-drive motor 72; it also is operative to reverse the drive of slide motor SM 73, returning slide 81 in the leftward direction L until shut off by operation of relay CR-1, meaning that the centered position of slide 81 has been sensed. The Return Right cycle is then certified complete, by signal output at 99 to circuitry to be described in connection with FIG. 9.

The Pickup Left and Return Left cycles of FIGS. 8c and 8d, respectively, are self-explanatory by analogy to the cycles described for the right-matrix operations of FIGS. 8a and 8b. Actually, the left-matrix operations of FIGS. 8c and 8d are the mirror-images of the right-matrix operations of FIGS. 8a and 8b. Thus, the Pickup Left cycle comprises an initial leftward full displacement of slide 81 until limit switch LS-1 operates relay CR-2 to (a) excite the solenoid, (b) reverse the drive of slide motor SM 73, and (c) initiate the rightward drive of belts 75–75′. Switch LS-7 certifies 70 percent loading of the retrieved (extracted) container onto the belt system and is operative to drop out the solenoid and reverse the slide-motor drive, returning the same to its centered position, as detected upon operation of relay CR-1. The belt drive is terminated when relay CR-3 certifies a symmetrical (centered) loading of the container on the elevator. In the Return Left cycle, the belts are driven to the left, and slide 81 is driven to the right until switch LS-7 certifies container-clearance for operation of the solenoid and reversal of slide-motor drive, relay CR-2 certifies full leftward displacement of slide 81 and of the returned container, thereby dropping out the belt drive and solenoid while reversing the slide drive for return to centered position (centified by relay CR-1).

LOGIC CIRCUITS AND OPERATION

Having described container-retrieve (extractor) and return mechanism and function with reference to FIGS 4 to 8, the electronic logic, command and sequencing functions will now be described for the overall system, with particular reference to FIG. 9.

In general sense, the electronics for the basic system have been explained in detail in the aforementioned Castaldi patent. Thus, even though operation of the presently disclosed (modified) container-handling mechanism differs fundamentally only in the extractor functions, the general electronics will nevertheless be explained in order to aid visualization.

Under the inventive arrangement, three container or file boxes 10 may be sequentially brought forward for personnel access or use, and the system is programmed to memorize the respective "home" positions of each. The three "use" positions are suggested in FIG. 4, namely, "centered" on elevator 26 at the $A'_3$ coordinates, "shuttle-left" ($A'_{3l}$) and "shuttle-right" ($A'_{3R}$). Each of the three is preferably at desk height to facilitate use.

Retrieval of a container to the center position is accomplished much in the manner described in the Castaldi patent. In order to extract an item from the storage matrices, including the left and right matrix, a decimal number identifying the desired compartment is entered on keyboard 110. The entered digits are forwarded to a decimal-to-binary converter 111 where the series decimal presentation is converted to parallel binary-decimal form. Converter 111 may be of any of the well-known types of decimal-to-binary converters. Logic is provided within the keyboard or converter to evaluate whether the number entered describes a compartment in matrix left or matrix right. This may easily be accommodated by a suffix or prefix bit in the location code. The subsequent depression of a retrieve button on the keyboard, illustrated in isolated form at 113, simultaneously enters the converted code identifying the compartment into buffer store 114, thereby initiating the retrieve cycle, and enters the compartment address and left/right indication through a shuttle-logic circuit 112 into a multi-address store 115.

It is the function of the buffer 114 to initiate the search and to offer a comparison between the code being read by horizontal and vertical scanners 132 and 134 (which are physically searching for the compartment address) and the entered code designating the position of the desired compartment. The buffer may, for example, comprise a single matrix of ferrite cores which are interrogated by the horizontal and vertical comparators 116 and 118 which in turn control the horizontal and vertical motor control circuits 117 and 119, respectively. The scanners and their associated circuitry have been described in detail in the aforementioned Castaldi patent and will not be further described herein. Suffice it to say that any scanning arrangement which permits verification that the carriage apparatus is positioned opposite the selected compartment will satisfy the functional requisites of the inventive arrangement. Such verification is received from comparators 116 and 118 and stored in a position-certifying circuit 120.

Receipt of a position certification signal activates the shuttle-logic circuit 112 which in turn signals the extractor control 121; in FIG. 7, this extractor control is identified by reference numeral 98. The signal to the extractor control will in this case take one of the two forms: "Start Pickup Right", or "Start Pickup Left", depending upon whether the desired container is in matrix right or matrix left.

Shuttle-logic circuit 112 is a basic logic circuit well known to those skilled in the art, selecting command signals from a variety of inputs acting logically upon them and signalling the extractor control over either a plurality of wires or in coded binary form over a single wire, such signal to the extractor control being one of four command signals. The signal to the buffer is preferably single binary start signal to commence the search-sequencing operations.

At this point in time, the extractor program sequence (previously described) withdraws the selected container and places it on the elevator platform. When the container is correctly located and centered on the platform, a cycle complete certification signal (output connection 99 in FIG. 7) is transmitted to the shuttle-logic circuit 112, which then triggers the retrieve-control circuit 122. The retrieve-control control circuit is permanently pre-programmed with the platform-carriage position shown in FIG. 4 (i.e., to the forward matrix-coordinate location $A'_3$) and upon being triggered substitutes this position in the buffer 114. The carriage and platform are then sequenced as previously described to this location.

The container is now disposed at desk height for use. Container return to the appropriate compartment is accomplished by depression of a return key 123 (illustrated in isolated form). This signal empties the multi-address store 115 with the compartment location through the shuttle logic into buffer 114, thereby sequencing the platform and carriage to the desired compartment. When a position-certification signal is received from circuit 120, shuttle logic 112 (which has stored the left-right information from the compartment location) initiates a Return-Left or Return-Right signal command to the extractor control 121 (98, in FIG. 7), thereby sequencing the extractor in the manner previously described to return the container to its home position.

When it is desired to bring more than one container forward at a time, the retrieve-shuttle button 126 (illustrated in isolated form) is depressed, and a shuttle-command signal is stored through shuttle-logic circuit 112 in shuttle-command circuit 127. Under these circumstances, the normal cycle is effected in the manner previously described to position the container in the centered location, i.e., on the elevator at the $A'_3$ coordinates in FIG. 4. The position-certifying signal obtained from circuit 120 is then employed as an AND-logic command and, together with the shuttle-command signal, signals the extractor control with the command Return Left, thereby positioning the desired container in the $A'_{3L}$ position. This latter position is, for the purposes of this disclosure, deemed the primary shuttle position, that is, the first shuttle command will always preferentially locate the extracted container in the left-use position.

Initiation of the retriever-shuttle button also stores the compartment position in the multi-address store 115. In this case, it would be stored in the multi-address store at the shuttle-left location. Thereafter, any shuttle command received by the shuttle-command circuit 127 will cause a search of the multi-address store to determine whether the $A'_{3L}$ position is filled. If so, it will so indicate this determination to the shuttle logic, and, upon receipt of the position-certifying signal indicating the carriage and platform position shown in FIG. 4, will signal the extractor control with a Return-Right signal, thereby locating the subsequent container in the $A'_{3R}$ position. When the multi-address store has information indicating that both $A'_{3L}$ and $A'_{3R}$ have containers located therein, any subsequent retrieve-shuttle command will be converted by the shuttle logic to a retrieve command, thereby positioning and delivering any subsequent container upon the elevator platform into the position thereof indicated by FIG. 4.

When it is desired to return the containers to their home positions, return key 123 (shown isolated) is depressed first, and the cycle is reversed, the container on the platform being returned to its home position as designated in the multi-address store. Thereafter, either the left or right container may be returned by depression of the Return-Left or Return-Right buttons 129 and 130 (shown isolated), respectively. If the Return-Left button is depressed, for example, the extractor control is signalled Pickup Left by the shuttle logic which simultaneously empties the compartment location from multi-address store 115 into buffer 114. The extractor cycles as previously described to remove the container from the $A'_{3L}$ position and to position it on the elevator platform.

The receipt of a cycle-complete certification signal (99, in FIG. 7) then operates via the shuttle-logic circuit to commence the compartment search through butter 114 to locate the elevator platform opposite the desired compartment. Thereafter, the position-certifying circuit 120 cycles the extractor in the manner previously described to return the container to its compartment.

It will be understood that initiation of the Return-Left or Return-Right cycles by depression of buttons 129 and 130 simultaneously erases the corresponding store in the multi-address store 115, thereby permitting subsequent containers to be extracted from storage and located in the described preferential order of locations at open front inspection coordinates $A'_{3L}$, $A'_{3R}$, $A'_3$.

While the invention has been described in detail for the preferred form shown, it will be understood that modifications may be made without departing from the spirit and scope of the invention. For example, the particular means of sequencing operations, and of sensing container presence or location (LS-5, 6, 7, 8) or slide presence or location (LS-1, 2, 3, 4,) are purely illustrative. Also, for simplification, certain electrical interlocks have not been shown, since the provision of interlocks between functions is well understood. Thus, in the Return Right cycle program of FIG. 8b, the slide motor drive to the left (L) may be made to terminate upon additional interlock with slide actuation of the outer left limit switch LS-1, whereby the hook mechanism cannot be caused to erect unless both (a) slide 81 is at its extreme-left position (centified by LS-1) and container 10 has reached its 70 percent loaded condition (certified by LS-6).

What is claimed is:

1. Load-handling mechanism for an elevator platform having an elongate rectangular surface to be selectively right-left loaded and unloaded with one of a plurality of containers, said platform including endless-belt conveyor means having an upper horizontal course defining the general plane of said surface and extending longitudinally from end to end of said platform, first reversible-drive means for driving said conveyor means, elongate guide means parallel to the course of said conveyor mean and laterally offset therefrom, a slide slidable in said guide means within the longitudinal confines of said platform and confined to an elevation range beneath said plane, second reversible drive means for positioning said slide along said guide means, container-end engaging means retractably carried by said slide, said container means including an element having a longitudinal lost-motion connection to said slide, actuating means for selectively displacing said end-engaging means between a projected container-engageable position above said plane and a retracted position below said plane, and automatic load-unload cycle-control means including longitudinally arrayed container-presence sensing means and longitudinally arrayed slide-presence sensing means governing belt transport of a container essentially for those positions when a container is at least primarily supported on said conveyor means, said control means further responding to the sensed location and degree of container loading on said conveyor means for governing actuation of said container-engaging means to projected position only (a) when the container is less than primarily supported on said conveyor means and (b) when said slide is in a position longitudinally offset from the container.

2. Load-handling mechanism for an elevator platform having an elongate rectangular surface to be selectively right-left loaded and unloaded with one of a plurality of like rectangular-prismatic containers of length at least no greater than the longitudinal limits of said platform, said platform including endless-belt conveyor means having an upper horizontal course defining the general plane of said surface and extending longitudinally between said limits, first reversible-drive means for driving said conveyor means, elongate guide means parallel to the course of said conveyor means and laterally offset therefrom, a slide slidable in said guide means within said limits and confined to an elevation range beneath said plane, second reversible drive means for positioning said slide along said guide means, container-end engaging means retractably carried by said slide, actuating means for selectively displacing said end-engaging means between a projected container-engageable position above said plane and a retracted position below said plane, and automatic load-unload cycle-control means including longitudinally arrayed container-presence sensing means and longitudinally arrayed slide-presence sensing means;

said control means having a platform-load cycle program with means for selecting the right-left direction from which a container is to be loaded onto said platform, said load-cycle program sequentially determining (a) slide drive in the selected direction to the corresponding limit of slide displacement, (b) projected actuation of said engageable means into end engagement with a container, (c) retracting displacement of said slide and the engaged container, (d) drive of said conveyor means in the retracting direction, (e) retraction actuation of said engageable means upon sensed detection that the container is at least primarily supported on said conveyor means, and (f) termination of drive of said conveyor means upon sensed detection that the container is fully supported on said conveyor means and within said limits;

said control means further having a platform-unload-cycle program with means for selecting the right-left direction in which a container is to be unloaded from said platform, said unload-cycle program sequentially determining (a) drive of said conveyor means in the selected direction, (b) drive of said slide in the opposite direction, (c) slide-drive reversal and projected actuation of said engageable means into container-engageable position upon sensed detection that said slide has cleared the end of the container, and (d) termination of slide drive in the selected unload direction and retraction acturation of said engageable means upon sensed detection that said slide has achieved its limit of movement in the selected unload unload direction.

3. Mechanism according to claim 2, in which the platform-load cycle program additionally includes termination of slide drive upon sensed detection that said slide is centrally positioned along said guide means.

4. Mechanism according to claim 2, in which the platform-unload cycle program additionally includes (e) slide-drive reversal upon sensed detection that said slide has achieved said limit of movement, and (f) termination of slide drive upon sensed detection that said slide is centrally positioned along said guide means.

5. Mechanism according to claim 2, in which said conveyor means comprises two like spaced parallel longitudinally extending belts and means for driving the same in unison, said guide means and slide being carried between said belts.

6. Mechanism according to claim 5, in which the overall transverse span between outer lateral limits of said spaced belts is approximately the width of a container handle thereby.

7. Mechanism according to claim 5, in which said platform includes parallel container-locating guide rails outside the outer lateral limits of said spaced belts.

8. Mechanism according to claim 1, in which said lost-motion connection includes spring means resiliently loading said element to longitudinally outer limit of lost-motion.

9. Mechanism according to claim 1, in which said lost-motion connection pivotally connects said element to said slide, said element projecting at substantially 90° to the longitudinal direction of slide guidance when at the forward limit of lost motion and being inclined at an acute angle when at the rear limit of lost motion; the formation of said element being such, in relation to the extent of lost motion and to the formation of the container part with which said element is engageable, that upon outwardly pushed displacement of the container by said element when at the rear limit of lost motion, the container is so driven to its home-returned position that upon a cycle of retraction of said container-engageable means followed by projection of the same with said element at the forward limit of lost motion, said container part will have been correctly engaged for a container-extraction displacement upon slide drive in the withdrawing direction.

10. Mechanism according to claim 1, in which said container-engageable element is one of two at longitudinal ends of a longitudinal shaft journaled in said slide, said actuating means comprising means for selectively imparting partial rotation to said shaft, for displacing said elements between retracted and projected position.

11. Mechanism according to claim 2, in which said container-engaging means includes an element having a longitudinal lost-motion connection to said slide.

12. Load-handling mechanism for an elevator platform having platform elongate rectangular surface to be selectively right-left loaded and unloaded with one of a plurality of containers, a container of size accommodated by said surface and to be thus loaded and unloaded, said platform including endless-belt conveyor means having an upper horizontal course defining the general plane of said surface and extending longitudinally from end to end of said platform, first reversible-drive means for driving said conveyor means, elongate guide means parallel to the course of said conveyor means and laterally offset therefrom, a slide slidable in said guide means within the longitudinal confines of said platoform and confined to an elevation range beneath said plane, second reversible drive means for positioning said slide along said guide means, an engageable member at an end of said container, container-end engaging means including a member retractably carried by said slide for engagement with said container-end member, said container-engaging means including an element having a longitudinal lost-motion connection to one of said members, actuating means for selectively displacing said end-engaging means between a projected container-engageable position above said plane and a retracted position below said plane, and automatic load-unload cycle-control means including longitudinally arrayed container-presence sensing means and longitudinally arrayed slide-presence sensing means governing belt transport of a container essentially for those positions when a container is at least primarily supported on said conveyor means, said control means further responding to the sensed location and degree of container loading on said conveyor means for governing actuation of said container-engaging means to projected position only (a) when the container is less than primarily supported on said conveyor means and (b) when said slide is in a position longitudinally offset from the container.

13. Mechanism according to claim 12, in which said lost-motion connection is to said slide-carried member.

* * * * *